(12) United States Patent
Monaghan et al.

(10) Patent No.: US 12,100,100 B2
(45) Date of Patent: Sep. 24, 2024

(54) SYSTEMS AND METHODS FOR SIGNAL-BASED POINT CLOUD REPRESENTATION

(71) Applicant: Illuscio, Inc., Culver City, CA (US)

(72) Inventors: Robert Monaghan, Ventura, CA (US); Fatemeh Jamalidinan, Los Angeles, CA (US); Mark Weingartner, Woodland Hills, CA (US); Dwayne Elahie, Los Angeles, CA (US); Kevin Edward Dean, Greenwood, IN (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/418,664

(22) Filed: Jan. 22, 2024

(65) Prior Publication Data

US 2024/0273825 A1 Aug. 15, 2024

Related U.S. Application Data

(63) Continuation of application No. 18/364,576, filed on Aug. 3, 2023, now Pat. No. 11,893,684, which is a continuation of application No. 18/168,673, filed on Feb. 14, 2023, now Pat. No. 11,748,945.

(51) Int. Cl.
*G06T 17/00* (2006.01)
*G06T 15/20* (2011.01)

(52) U.S. Cl.
CPC ............ *G06T 17/005* (2013.01); *G06T 15/20* (2013.01); *G06T 2210/36* (2013.01); *G06T 2210/56* (2013.01)

(58) Field of Classification Search
None
See application file for complete search history.

(56) References Cited

U.S. PATENT DOCUMENTS

| | | |
|---|---|---|
| 2020/0092584 A1 | 3/2020 | Cai et al. |
| 2021/0049828 A1 | 2/2021 | Park et al. |
| 2022/0417557 A1 | 12/2022 | Oh et al. |

OTHER PUBLICATIONS

An overview of ongoing point cloud compression standardization activities: Video-based (V-PCC) and geometry-based (G-PCC). APSIPA Transactions on Signal and Information Processing 9 (2020): e13 (Year: 2020).*

* cited by examiner

*Primary Examiner* — Nurun Flora
(74) *Attorney, Agent, or Firm* — Ansari Katiraei LLP; Arman Katiraei; Sadiq Ansari

(57) ABSTRACT

Disclosed is an encoding and decoding system and associated methods for producing a compressed waveform that encodes data points of a point cloud in a format and size that may be transmitted over a data network, decompressed, decoded, and rendered on a remote device without the buffering or lag associated with transmitting and rendering an uncompressed point cloud. The encoder receives a request from a remote device to access the point cloud, encodes a set of data points from the point cloud as one or more signals derived from values defined for the positional and non-positional elements of each data point from the set of data points, generates one or more compressed waveforms from compressing the one or more signals and transmits the one or more compressed waveforms to the remote device in response to the request for decompression, decoding, and image rendering.

20 Claims, 8 Drawing Sheets

SYSTEMS AND METHODS FOR SIGNAL-BASED POINT CLOUD REPRESENTATION

CLAIM OF BENEFIT TO RELATED APPLICATIONS

This application is a continuation of U.S. nonprovisional application Ser. No. 18/364,576 entitled "Systems and Methods for Signal-Based Point Cloud Representation", filed Aug. 3, 2023 which is a continuation of U.S. nonprovisional application Ser. No. 18/168,673 entitled "Systems and Methods for Signal-Based Point Cloud Representation", filed Feb. 14, 2023 and issued as U.S. Pat. No. 11,748,948. The contents of application Ser. Nos. 18/364,576 and 18/168,673 are hereby incorporated by reference.

BACKGROUND

A point cloud is a three-dimensional ("3D") data format that is defined with data points distributed in a 3D space. The data points may model and/or represent the form and visual characteristics of a 3D object or scene.

Point clouds are often very large in size because they contain millions or billions of data points when generating a high-resolution representation of the modeled 3D object or scene. Specifically, the data points store the 3D spatial and structural information of the modeled 3D object or scene with each data point being defined with positional elements for the position of that data point about the modeled 3D object or scene, and with non-positional elements for the visual characteristics of the data point.

Rendering the point cloud data points is slow because of the amount of data that is associated with each data point and because of the number of data points that are within any given field-of-view. Specifically, a point cloud may have orders of magnitude more data to process when rendering a scene than a mesh-based or polygon-based representation or modeling of the same scene.

DETAILED DESCRIPTION OF PREFERRED EMBODIMENTS

Figure 1:
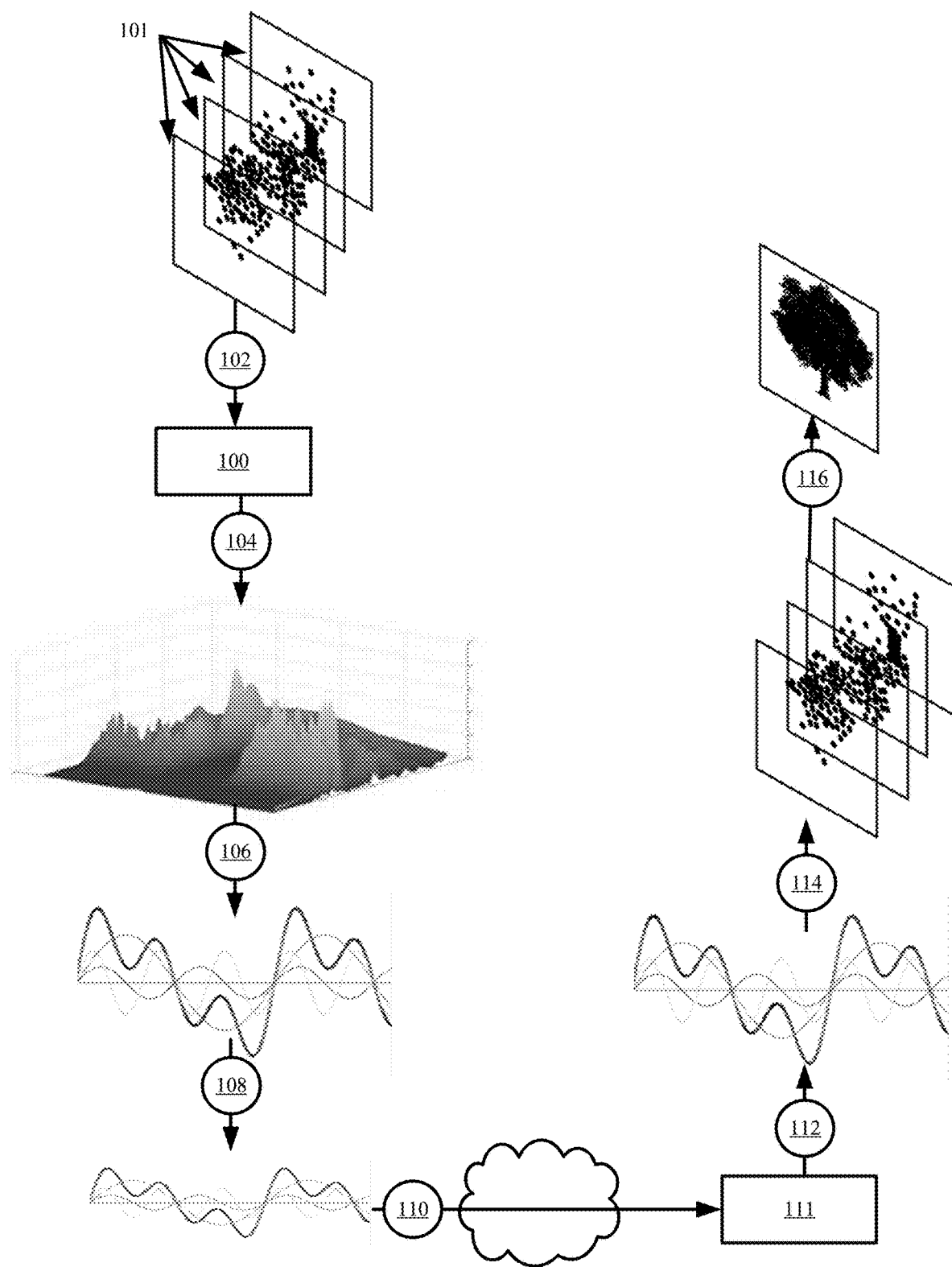
FIG. 1 illustrates an example of generating a waveform representation of a point cloud in accordance with some embodiments.

The following detailed description refers to the accompanying drawings. The same reference numbers in different drawings may identify the same or similar elements.

Provided are systems and methods for generating a signal-based representation of a point cloud. The systems and methods include an encoder and a decoder for producing one or more waveforms to represent the point cloud data points, and for compressing the one or more waveforms using different digital signal processing techniques so that the point cloud is of a size that may be transmitted from a local device over a data network, decoded, and rendered on a remote device running the decoder without the buffering or lag that would accompany the transmission of an uncompressed point cloud.

The encoder converts the data associated with the positional elements and non-positional elements of each point cloud data point to different frequency domains, and generates one or more waveforms or signals based on the converted frequencies. In some embodiments, the encoder performs a dynamic encoding that encodes different regions of the point cloud as separate waveforms or signals so that the individual waveforms or signals are generated in less time than when encoding the entire point cloud, are smaller in size than waveforms or signals encoding data from all data points of the point cloud, and are transmitted in less time and using less bandwidth than an encoding of the entire point cloud.

In some embodiments, the encoder intelligently generates and sends the individual waveforms or signals encoding the positional and non-positional data from a particular set of data points for a current field-of-view being accessed on a remote device, and predictively streams the individual waveforms or signals encoding the positional and non-positional data for different sets of data points that neighbor or surround the fields-of-view (e.g., the particular set of data points) so that the positional and non-positional data for the neighboring regions is cached at the remote device and may be accessed without an encoding or transmission latency once the field-of-view changes from the current field-of-view. In some such embodiments, the encoder tracks a requested view or render position in the point cloud on the remote device running the decoder, generates the one or more waveform representations for the different sets of data points in regions surrounding the view or render position or next regions that the view or render position will likely move to, and transmits the one or more waveform representations to the remote device ahead of the view or render position changing to the encoded regions. The one or more waveform representations may be compressed prior to transmission using waveform compression techniques or signal compression algorithms, or may be transmitted without compression.

The decoder executes on the remote device that receives the one or more waveforms or signals from the encoder running on a local device where the original unencoded point cloud data is stored. The decoder converts the received waveforms or signals to the original values for the positional elements and non-positional elements of the encoded data points. In other words, the decoder restores the point cloud data points from the received waveforms or signals. In some embodiments, the decoder decompresses the compressed waveforms prior to decoding the uncompressed positional and non-positional data from the waveforms.

The decoder constructs a tree-based representation of the point cloud by downsampling and/or upsampling the received waveforms or signals prior to decoding. Specifically, the decoder generates and/or decodes the point cloud data at different levels of downsampling or resampling represented by higher layers or parent nodes of the tree-based representation directly from the received waveforms or signals. Accordingly, rather than send the original point cloud data with the additional data for the tree-based representation of the point cloud (e.g., data associated with the parent nodes at each level of the tree-based representation that is above the leaf nodes) from the local device to the remote device, the encoder on the local device may send the one or more waveforms or signals that encode the original point cloud data, and the decoder on the remote device may decode the original point cloud data and the resampled point cloud data for the different levels of the tree-based representation of the point cloud by sampling the received waveforms or signals at different rates and/or using different signal processing techniques.

FIG. 1 illustrates an example of generating a waveform representation of a point cloud in accordance with some embodiments. Encoder 100 receives (at 102) point cloud 101.

Point cloud 101 may be generated by scanning a scene or other three-dimensional ("3D") environment using one or more of a 3D or depth-sensing camera, a structured light or patterned light imaging device, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. In some embodiments, point cloud 101 is a digitally created scene of a virtual object and/or environment.

The data points of point cloud 101 differ from pixels of a two-dimensional ("2D") image, because certain regions of point cloud 101 may have no data points, lower densities of data points, and/or higher densities of data points based on varying amounts of visual information that is detected or scanned at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements.

The positional elements include coordinates within 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point.

The non-positional elements may include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional element store other measured or derived characteristics including the chrominance, hardness, translucence, reflectivity, luminance, metallic characteristics, roughness, specular, diffuse, albedo, index of refraction ("IOR"), and/or other properties from the imaged surface, feature, or object. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of the data points. For instance, the characteristics may include a Tesla strength value to quantify the strength of the magnetic field that was used in detecting and/or imaging the surface, feature, or object represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Encoder 100 converts (at 104) the point cloud data points to the frequency domain. For instance, encoder 100 uses a 3D Fourier transform, a 3D discrete cosine transform ("DCT"), a 3D discrete Fourier transform ("DFT"), a graph Fourier transform, and/or another mathematical transform that maps the data points to the frequency domain based on differing frequencies with which combinations of values from two or more positional and/or non-positional elements are defined in the data points.

In some embodiments, encoder 100 converts (at 104) the values defined for each positional element and each non-positional element of the point cloud data points to a different frequency domain. For instance, a different frequency domain representation is generated for each of the x-coordinate, y-coordinate, z-coordinate, red color value, green color value, and blue color value of the data points.

Encoder 100 generates (at 106) one or more waveforms that encode the frequencies representing the positional and non-positional values of the point cloud data points. For instance, encoder 100 generates (at 106) a first waveform or signal to encode the x-coordinate values of the data points, a second waveform or signal to encode the y-coordinate values of the data points, and so on.

In some embodiments, the one or more waveforms may be defined as one or more cosine waves, sine waves, or other waveforms with a non-uniform shape that provide a lossless encoding of the point cloud data (e.g., an encoding that preserves the original values from the positional elements and non-positional elements of the point cloud data points). The generated (at 106) waveforms produce a lossless encoding of the point cloud data points. In other words, the frequencies representing each data point element may be decoded back into the original values via an inverse 3D transform function.

In some embodiments, encoder 100 combines the one or more waveforms that are generated (at 106) to represent each data point element into a single 3D waveform. For instance, the one or more waveforms may be combined with different phases offsets so as to not interfere with one another.

Encoder 100 compresses (at 108) the one or more waveforms or the combined 3D waveform. The compression (at 108) is performed using existing digital signal processing techniques or signal compression algorithms. The compression (at 108) may be lossless or lossy. For instance, encoder 100 may use Run Length Encoding, Lempel-Ziv-Welch ("LZW"), LZ77, LZ78, Huffman Coding, Arithmetic Encoding, and/or other lossless signal compression algorithms to reduce the size of the waveforms without data loss.

Encoder 100 streams (at 110) the compressed waveforms over a data network to a remote device running decoder 111. In some embodiments, encoder 100 streams the compressed waveforms to the remote device over a wired or wireless data network using data packets of one or more streaming protocols for audio and/or video streaming. In some embodiments, encoder 100 sends the one or more waveforms without compression to the remote device.

Decoder 111 receives (at 110) the compressed waveforms, decompresses (at 112) the compressed waveforms, and decodes (at 114) the original point cloud data from the decompressed waveforms. Decoder 111 generates the original values for the positional and/or non-positional elements of each point cloud data point that is encoded in one of the transmitted waveforms. For a lossy encoding and/or compression, decoder 111 generates the original values for the positional and non-positional elements of a downsampled subset of the encoded data points, or with approximate values for one or more of the positional and/or non-positional elements of the encoded data points.

Decoder 111 renders (at 116) the decoded values to produce a visualization of point cloud 101 on a display of the remote device. Accordingly, the visualization is generated on the remote device without transmitting every bit for every positional and/or non-positional element of the rendered data points in an uncompressed form.

In some embodiments, decoder 111 directly creates a tree-based representation of the point cloud from the waveform representation of the point cloud, and uses the tree-based representation to accelerate the rendering of the point cloud. Specifically, the leaf nodes of the tree-based representation represent or contain the data associated with the point cloud data points. Each parent node that directly connects to a set of leaf nodes provides a decimated, downsampled, or reduced representation of the data associated with the set of data points in a particular region of the point cloud spanned by that set of leaf nodes. Each additional layer with nodes above the parent nodes defines a combined region spanned by two or more parent nodes with even greater decimation or downsampling. Accordingly, each node in the tree-based representation that is a layer closer to the root node contains less detail, resolution, or data points for the region of the point cloud spanned by that node. The less detail, resolution, or data points provide for a faster rendering of the corresponding region than if all data points in that region were rendered which is acceptable in instances when the view or render position is far enough away from the rendered region that the loss of detail or resolution does not affect the image quality and/or cannot be perceived by the human eye.

Decoder 111 directly creates the tree-based representation by downsampling the waveforms to decode the downsampled data for the parent nodes at the different levels of the tree-based representation. Specifically, decoder 111 may apply denoising algorithms and/or other signal processing techniques to decode a reduced and/or targeted sampling of data points from the waveforms, wherein the targeted sampling may be used to extract a first set of data points that are of specific interest and/or that preserve specific details while removing or discarding a second set of data points that are not of interest, represent background components, irrelevant detail, and/or represent other features that do not significantly degrade the image quality if decimated or removed.

Accordingly, the downsampled data for the parent nodes of the tree-based representation does not need to be encoded and transmitted as part of the waveforms, thereby reducing the total amount of data transmitted between the local device and the remote device. In other words, the compressed waveform representations of the point cloud data points may be transmitted in less time using less bandwidth than waveforms encoding the point cloud data points and the data for the parent nodes of the tree-based representation or sending one or more of the point cloud data points and tree-based representation in an uncompressed form.

Figure 2:
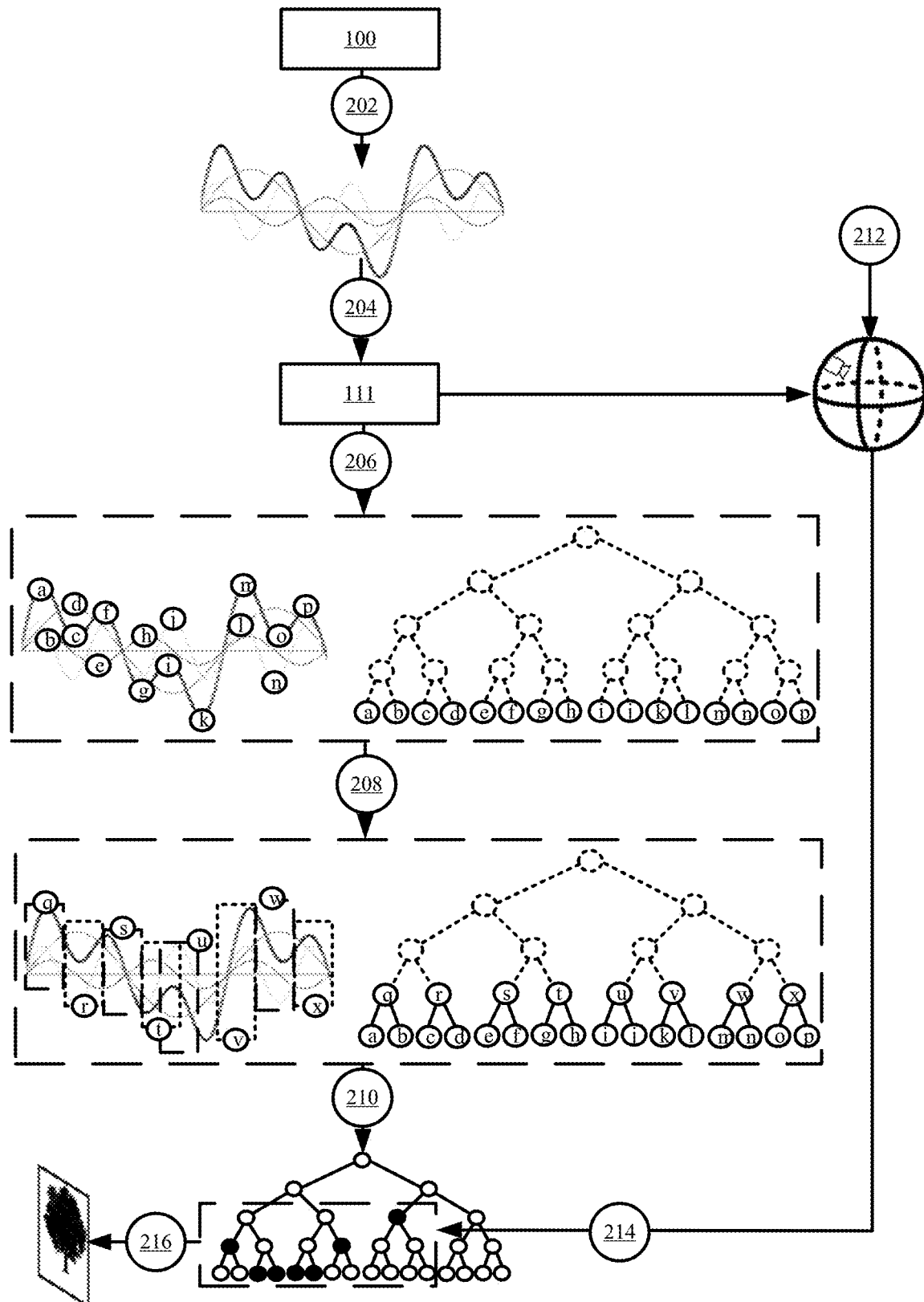
FIG. 2 illustrates an example of constructing a tree-based representation of a point cloud from a waveform encoding of the point cloud in accordance with some embodiments presented herein.

FIG. 2 illustrates an example of constructing a tree-based representation of a point cloud from a waveform encoding of the point cloud in accordance with some embodiments presented herein. Encoder 100 runs on a local device and generates (at 202) the compressed or uncompressed waveforms that encode the point cloud data points. In some embodiments, encoder 100 generates (at 202) the waveforms by encoding the data contained in the leaf nodes of a tree-based representation of the point cloud that was created or stored on the local device. For instance, the local device may construct the tree-based representation by decimating or resampling the point cloud data points, or may load the tree-based representation that is stored with the point cloud data points.

The local device transmits (at 204) the generated (at 202) waveforms to the remote device. Decoder 111 executes on the remote device and decompresses and/or decodes (at 206)

the waveforms to extract the leaf nodes for the tree-based representation. For instance, decoder 111 decodes (at 206) the values for the positional and non-positional elements of the point cloud data points that were encoded into the waveforms, and defines the leaf nodes for the tree-based representation by arranging the data points based on their relative positioning as defined by their respective positional elements.

Decoder 111 downsamples (at 208 and 210) the decompressed waveforms to generate the nodes for the upper layers of the tree-based representation. The downsampling (at 208) may occur in the same or different decoding passes as the decoding (at 206) of the leaf nodes an/or point cloud data points. For instance, decoder 111 performs a first decoding pass to extract the data for every data point encoded as part of the waveforms, and to define the leaf nodes of the tree-based representation. Decoder 111 performs a second decoding pass that downsamples the waveforms by a first amount. The downsampling (at 208 and 210) involves extracting fewer data points and/or combining values encoded for a subset of data points into a single set of values for a parent node of the tree-based representation that represents the subset of data points with a first amount of decimation. Additional downsampling passes increase the amount of decimation and decrease the number of data points or point cloud data that is extracted for increasingly larger regions of space spanned by the point cloud in order to define the upper layers of the tree-based representation.

The remote device and/or decoder 111 receives (at 212) a request to render the point cloud from a particular render position. Decoder 111 or a rendering system that executes in conjunction with decoder 111 determines different levels of detail at which to render different regions of the point cloud falling within a field-of-view defined from the particular render position, selects (at 214) nodes at different layers of the tree-based representation that provide the determined levels of detail for each region, and renders (at 216) the undecimated or decimated data contained within the selected nodes to generate a visualization with different detail and/or resolution at different parts of the visualization.

Figure 3:
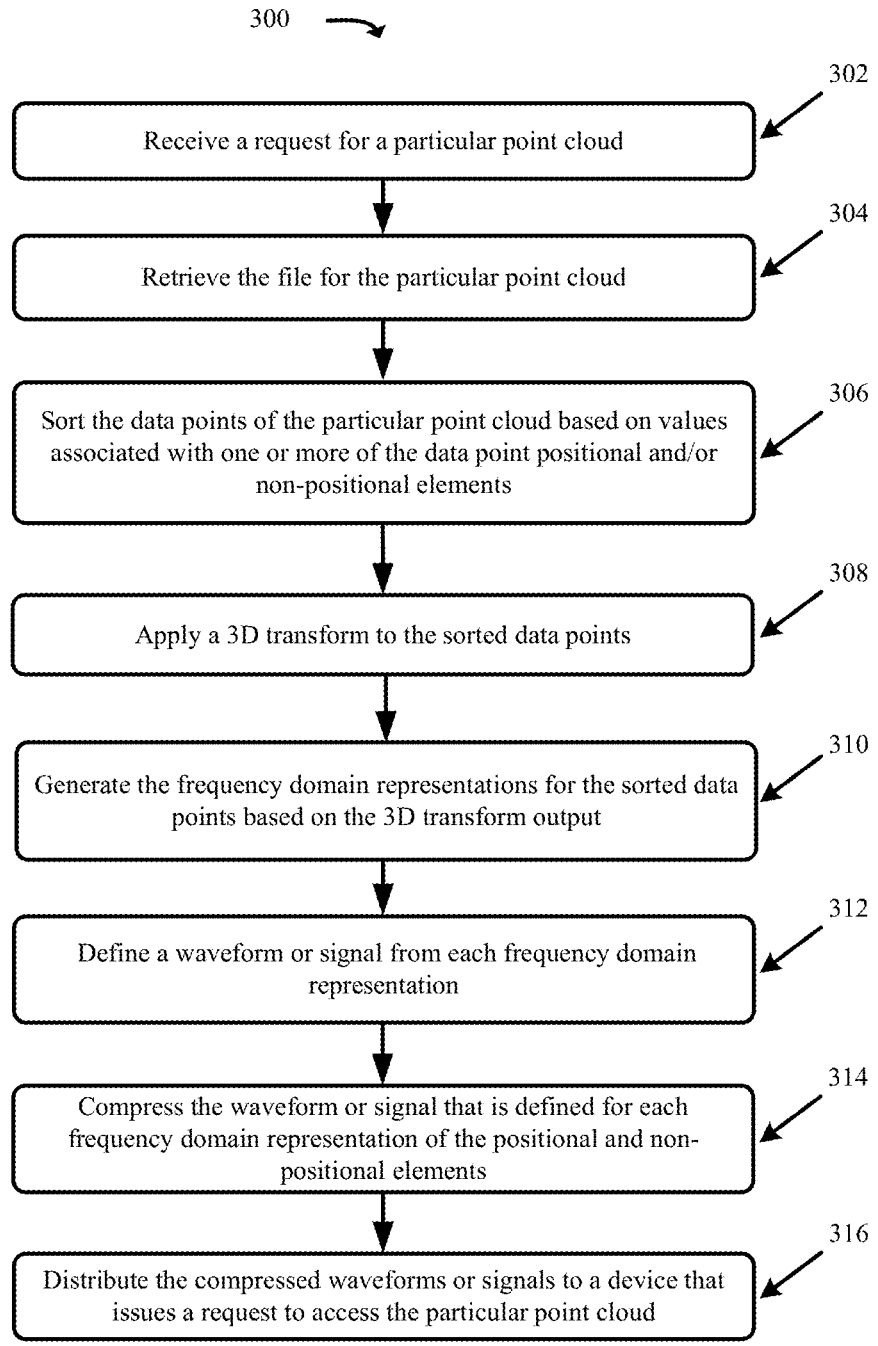
FIG. 3 presents a process for generating a waveform representation of a point cloud in accordance with some embodiments presented herein.

FIG. 3 presents a process 300 for generating a waveform representation of a point cloud in accordance with some embodiments presented herein. Process 300 is implemented by encoder 100.

Encoder 100 may include one or more devices of a point cloud distribution system with processor, memory, storage, network, and/or other hardware resources that are used to distribute point clouds in a encoded waveform or signal format to different remote devices over a data network. In some embodiments, the point cloud distribution system may produce metaverse, virtual reality, augmented reality, mixed reality, conferencing, and/or other 3D or high-resolution experiences on the remote devices by streaming the point clouds as compressed or uncompressed waveforms or signals.

Process 300 includes receiving (at 302) a request from a remote device for a particular point cloud. The request may include a HyperText Transfer Protocol ("HTTP") message with a Uniform Resource Locator ("URL") that identifies the particular point cloud.

Process 300 includes retrieving (at 304) the file for the particular point cloud. The file stores values for the positional elements and the non-positional elements of the point cloud data points.

Process 300 includes sorting (at 306) the data points based on values associated with one or more of the data point positional and/or non-positional elements. For instance, encoder 100 may sort (at 306) the data points according to increasing x-coordinate positional elements, followed by increasing y-coordinate positional elements, and followed by increasing z-coordinate positional elements. Similarly, encoder 100 may sort (at 306) the data points according to increasing red color values, followed by increasing green color values, and followed by increasing blue color values.

In any case, the sorting (at 306) provides a uniform or repeatable ordering for the data points. The uniform orderings is used to map between the original values defined for the positional and non-positional elements of the data points and the corresponding frequencies in the frequency domain. For instance, encoder 100 maps the specific x-coordinate position and the specific red color value of a particular data point to different frequencies in different frequency domains for the x-coordinate positional element and the red color non-positional element based on the sorted ordering of the data points, and decoder 111 may assign the values represented by those frequencies back to the particular data point during decoding based on the sorted ordering of the data points.

Process 300 includes applying (at 308) a 3D transform to the sorted data points, and generating (at 310) the frequency domain representations for the sorted data points based on the 3D transform output. The 3D transform may decompose the values defined for the positional and non-positional elements of the data points into different frequencies. For instance, the different values defined for the x-coordinate positional element of the stored data points may be mapped to frequencies in a first frequency domain representation of the x-coordinate positional element, and the different values defined for the red color non-positional element of the sorted data points may be mapped to frequencies in a second frequency domain representation of the red color non-positional element. Accordingly, generating (at 310) the frequency domain representations may include generating a different channel or frequency domain representation for each of the positional and non-positional elements of the data points that is to be encoded as a waveform.

Process 300 includes defining (at 312) a waveform or signal from each frequency domain representation. In some embodiments, defining (at 312) the waveform or signal includes generating a separate waveform for different sets of the positional and non-positional elements of the data points. For instance, encoder 100 may generate a first waveform based on the frequency domain representation of the x-coordinate positional element values, and a second waveform based on the frequency domain representation of the red color non-positional element values. Specifically, encoder 100 generates a sinusoidal signal or other waveform based on the frequencies that were mapped from of the positional and non-positional elements.

Process 300 includes compressing (at 314) the waveform or signal that is defined for each frequency domain representation of the positional and non-positional elements. As noted above, lossless compression algorithms (e.g., Run Length Encoding, LZW, LZ77, LZ78, Huffman Coding, Arithmetic Encoding, etc.) or lossy compression algorithms (e.g., Transform coding, DCT, Discrete Wavelet Transform, fractal compression, etc.) may be used to compress (at 314) the waveforms.

Process 300 includes distributing (at 316) the compressed waveforms or signals to a device that issues a request to access the particular point cloud. In some embodiments, HTTP Dynamic Streaming ("HDS"), HTTP Live Streaming ("HLS"), Dynamic Adaptive Streaming over HTTP ("DASH"), and/or other audio/video streaming protocols may be used to distribute (at 316) the compressed waveforms or signals to the requesting device as data packets transmitted over a data network.

In some embodiments, encoder 100 combines the compressed waveforms or signals into a single waveform prior to distribution (at 316). Encoder 100 may combine the compressed waveforms with different phase offsets.

In some embodiments, encoder 100 adapts existing video and/or image encoding techniques to create the compressed waveform representation for a point cloud. In some such embodiments, encoder 100 partitions the 3D point cloud into multiple 2D datasets, applies the 2D encoding techniques to the 2D datasets to defines a waveform representation for each 2D datasets, and streams the encoded 2D dataset waveform representations to a requesting device where the encoded 2D dataset waveform representations are decoded to extract the values for the 3D dataset of the point cloud.

Figure 4:
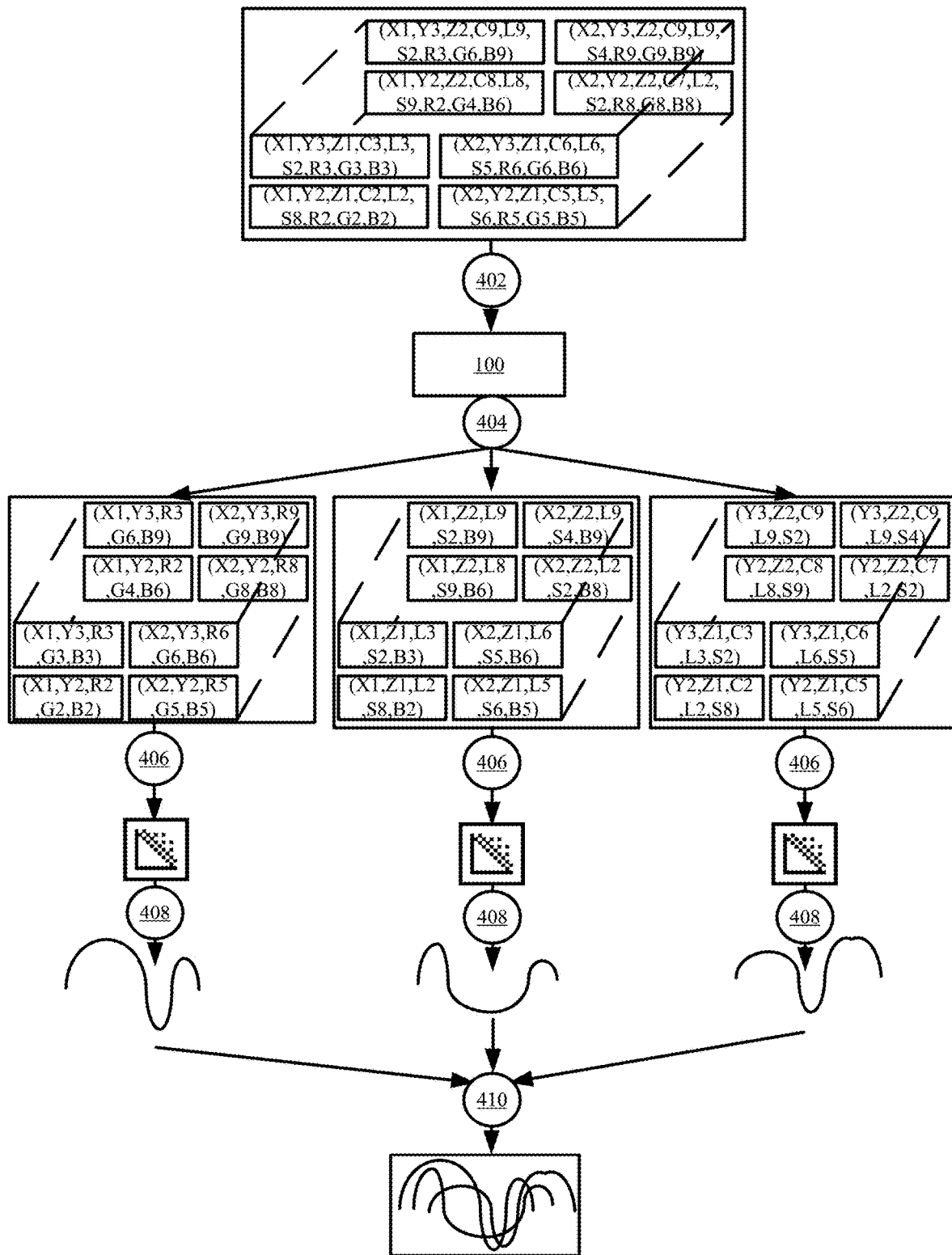
FIG. 4 illustrates an example of encoding a point cloud as a waveform using 2D encoding techniques in accordance with some embodiments presented herein.

FIG. 4 illustrates an example of encoding a point cloud as a waveform using 2D encoding techniques in accordance with some embodiments presented herein. Encoder 100 receives (at 402) the point cloud. The point cloud is a 3D data format or structure. In this example, the point cloud data points are defined with 3 positional elements for the x, y, and z coordinate position of the data point, and 6 non-positional elements for the reflectivity, luminance, specular, and red, green, and blue color components of the data point. The point cloud data point may be defined with more, less, or different elements.

Encoder 100 partitions (at 404) the 3D point cloud data into multiple 2D datasets. For instance, an inverse camera matrix technique may be used to generate the 2D datasets from the 3D point cloud data.

In some embodiments, partitioning (at 404) the point cloud data into the 2D datasets includes defining different datasets that retain the data point non-positional elements and that eliminate one positional element from the set of positional elements that define the 3D position for each data point. For instance, encoder 100 partitions the 3D point cloud data into a first 2D dataset that includes the x and y coordinate positional elements and the non-positional elements (e.g., red, green, blue, and/or other color components) of the point cloud data points, a second 2D dataset that includes the x and z positional elements and the non-positional elements of the point cloud data points, and a third 2D dataset that includes the y and z positional elements and the non-positional elements of the point cloud data points. In some other embodiments, partitioning (at 404) the 3D point cloud data into the 2D datasets includes defining each partitioned 2D dataset to include a different subset of the non-positional elements. For instance, the first 2D dataset includes the x and y coordinate positional elements and the red, green, and blue color component non-positional elements, the second 2D dataset includes the x and z positional elements and the blue color component, luminance, and specular non-positional elements of the point cloud data points, and the third 2D dataset includes the y and z positional elements and the specular, reflectivity, and translucence non-positional elements of the point cloud data points. In some such embodiments, the partitioned 2D datasets collectively include all the point cloud data, and the partitioned 2D datasets include sufficient element data to reconstruct the single 3D dataset of the point cloud.

Encoder 100 generates (at 406) a frequency domain representation for each partitioned 2D dataset using a 2D transform function. In some embodiments, generating (at 406) the frequency domain representation includes performing a lossless encoding of the positional and non-positional element data in each 2D dataset to the frequency domain. In some such embodiments, encoder 100 applies a DCT, Fourier Transform, or other image-to-signal processing technique to produce the lossless encoding for each partitioned 2D dataset in the frequency domain.

Encoder 100 converts (at 408) the frequency domain representation that is created for each partitioned 2D dataset into a different waveform. Encoder 100 combines (at 410) the different waveforms in a non-destructive manner to generate the single waveform representation of the 3D point cloud data. The non-destructive combination (at 410) of the waveforms may involve analyzing the frequency of each waveform, defining a phase offset for each waveform so that the frequencies do not interfere with one another, and merging and/or interleaving the waveforms with the defined offsets to produce a complex signal that preserves the signaling characteristics of each waveform despite the waveforms overlapping with one another.

Figure 5:
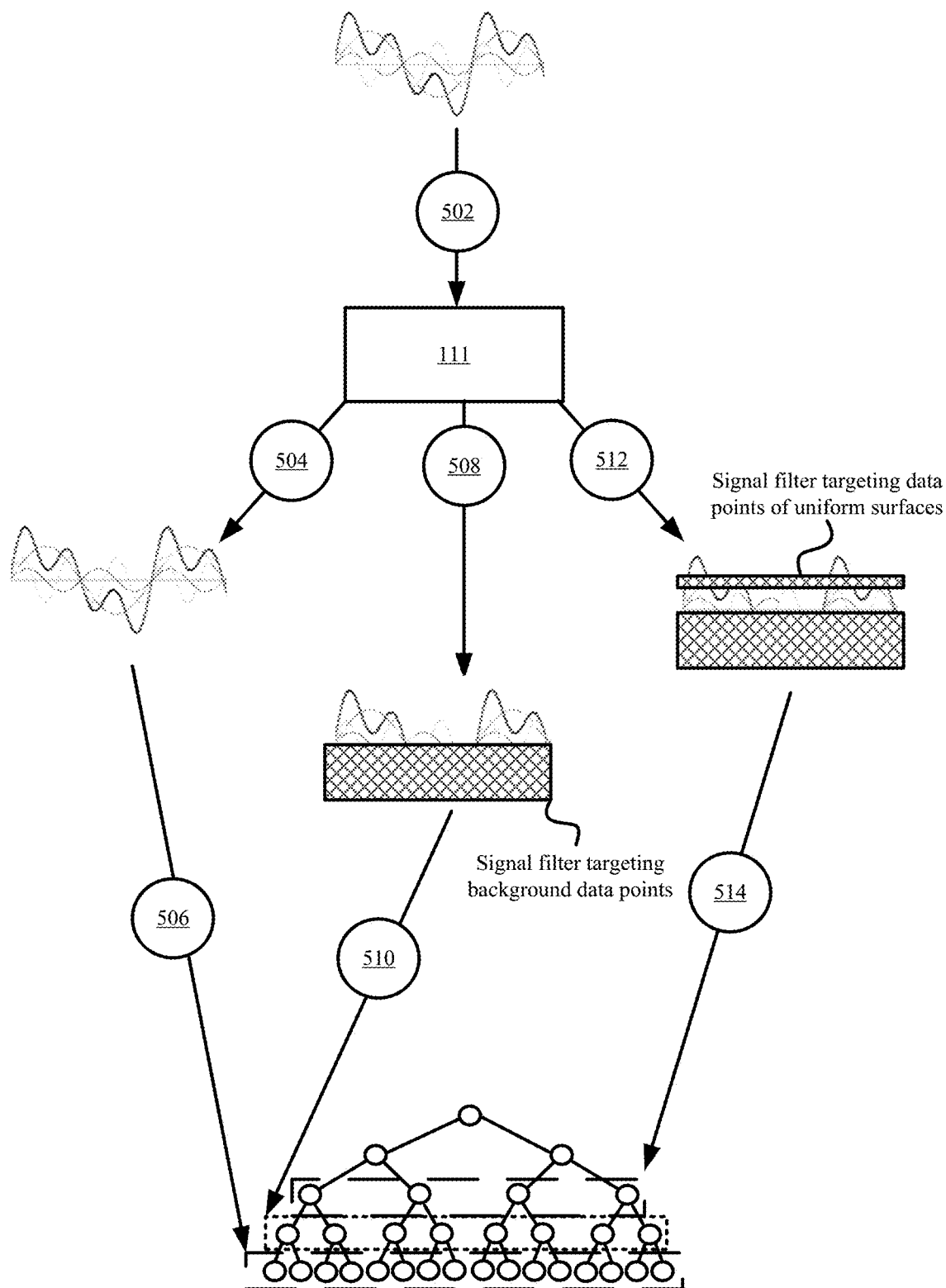
FIG. 5 illustrates an example of generating a tree-based representation of a point cloud from decoding of a waveform representation of the point cloud with different amounts of downsampling in accordance with some embodiments presented herein.

FIG. 5 illustrates an example of generating a tree-based representation of a point cloud from decoding of a waveform representation of the point cloud with different amounts of downsampling in accordance with some embodiments presented herein. Decoder 111 receives (at 502) the waveform encoding of the point cloud, and decompresses the waveform if it was compressed. The waveform encoding may be formed from two or more waveforms that encode values from different elements of the point cloud data points.

Decoder 111 decodes data from the waveform representation at different sampling rates and/or using signal filters. A signal filter may include a signal processing technique that filters certain characteristics of the waveform representation in order to downsample the data in a manner that preserves important detail or data points that are determined to be of interest, and that removes irrelevant detail or data points that do not contribute to the level of detail associated with the layer of the tree-based representation being generated. Accordingly, decoder 111 may apply additional signal filters when creating each layer of the tree-based representation in order to remove a different targeted set of data points or encoded data from each higher layer of the tree-based representation.

For instance, decoder 111 decodes (at 504) the original values for the positional and non-positional elements of the data points from the waveform representation without any signal filters and at the same sample rate or frequency at which the waveform representation was encoded. Decoder defines (at 506) the leaf nodes of the tree-based represented based on the data that is decoded for each data point.

Decoder 111 determines that background detail or data points at a certain depth in the 3D space of the point cloud are represented in a specific low frequency range of the waveform representation, and applies (at 508) a filter that removes that specific low frequency range from the waveform representation. Decoder 111 generates (at 510) nodes for a first parent layer of the tree-based representation that decimates, downsamples, reduces, or removes the background detail.

Decoder 111 applies (at 512) a next signal filter that targets other characteristics of the waveform representation for detail that is targeted for removal at a second grandparent layer of the tree-based representation. For instance, the next signal filter may target the signal characteristics for the encoded data points that contribute to highlights, lowlights, shadows, and/or surfaces with uniform coloring, structures, and/or other commonality in the point cloud. Decoder 111 generates (at 514) the nodes for the second grandparent layer of the tree-based representation based on the signal characteristics of the waveform representation that remain after filtering the waveform representation with the applied signal filters.

Accordingly, decoder 111 may apply different filters to sample and/or decode fewer and fewer data points from parts of the waveform representation having the specific signaling characteristics for the data points being targeted for resampling. Each node in a higher layer of the tree-based representation therefore represents a resampled, filtered, targeted, or reduced set of the leaf nodes directly or indirectly connected to that node, or for the region of the point cloud that is spanned or defined by the leaf nodes under that node.

In some other embodiments, decoder 111 samples and/or decodes the waveform representation at a different or lower frequency than the frequency at which the waveform representation is encoded. Consequently, decoder 111 decodes parts of the waveform representation that do not directly align with encoded data of a particular data point with the resulting decoding producing an interpolated data point that is derived from the positional and non-positional elements of two or more data points or that is defined with positional and/or non-positional derived from frequencies in the frequency domains that do not map to positional and/or non-positional values defined for any single data point.

Decoder 111 provides the tree-based representation to a rendering system on the same remote device as decoder 111. The rendering system traverses the tree-based representation to quickly locate the data points or leaf nodes that are within the field-of-view defined from a current render position, and/or to select nodes at different layers that provide a desired level of detail or image data for a region within the field-of-view.

In some embodiments, the compressed waveform representation may still be too large to stream from the local device with encoder 100 to the remote device with decoder 111, and/or to produce a continuous rendering of different scenes from the encoded point cloud on the remote device at a smooth rate (e.g., 30 frames per second) and/or without buffering or lag. For instance, the time to encode all data points of a point cloud into one or more waveforms and the time to compress the one or more waveforms may exceed a time threshold associated with requesting and receiving point cloud data for a current field-of-view at the remote device, the size of the one or more compressed waveforms encoding the entire point cloud may exceed a threshold size of the amount of data that may be streamed to the remote device in a given time window, and/or the time to decompress and decode the one or more waveforms may exceed a time threshold associated with generating the visualization of a changing field-of-view as a result of having to decompress and decode data for data points that are not in the changing field-of-view.

Accordingly, encoder 100 and decoder 111 perform a concerted operation to reduce the complexity associated with encoding, compressing, streaming, decompressing, and decoding the waveforms. Specifically, encoder 100 partitions the point cloud into chunks, generates separate compressed or uncompressed waveform representations for the data points contained within each chunk, and streams the particular waveform representation for the chunk that contains the data points within a current field-of-view from the local device to the remote device. Decoder 111 decompresses and/or decodes the particular waveform representation, and generates an image, visualization, or frame for the current field-of-view by rendering the decompressed and/or decoded data from the particular waveform representation.

In some embodiments, encoder 100 and decoder 111 further improve performance via the concerted operation with encoder 100 tracking a view or render position in the point cloud on the remote device running decoder 111, generating the compressed waveform representations for the sets of data points in chunks representing regions surrounding the view or render position or next regions that the view or render position will move to, and transmitting the compressed waveform representations to the remote device ahead of the view or render position changing to the encoded regions. Each chunk or region corresponds to a volume within the 3D space of the point cloud that encompasses a different set of the point cloud data points.

Figure 6:
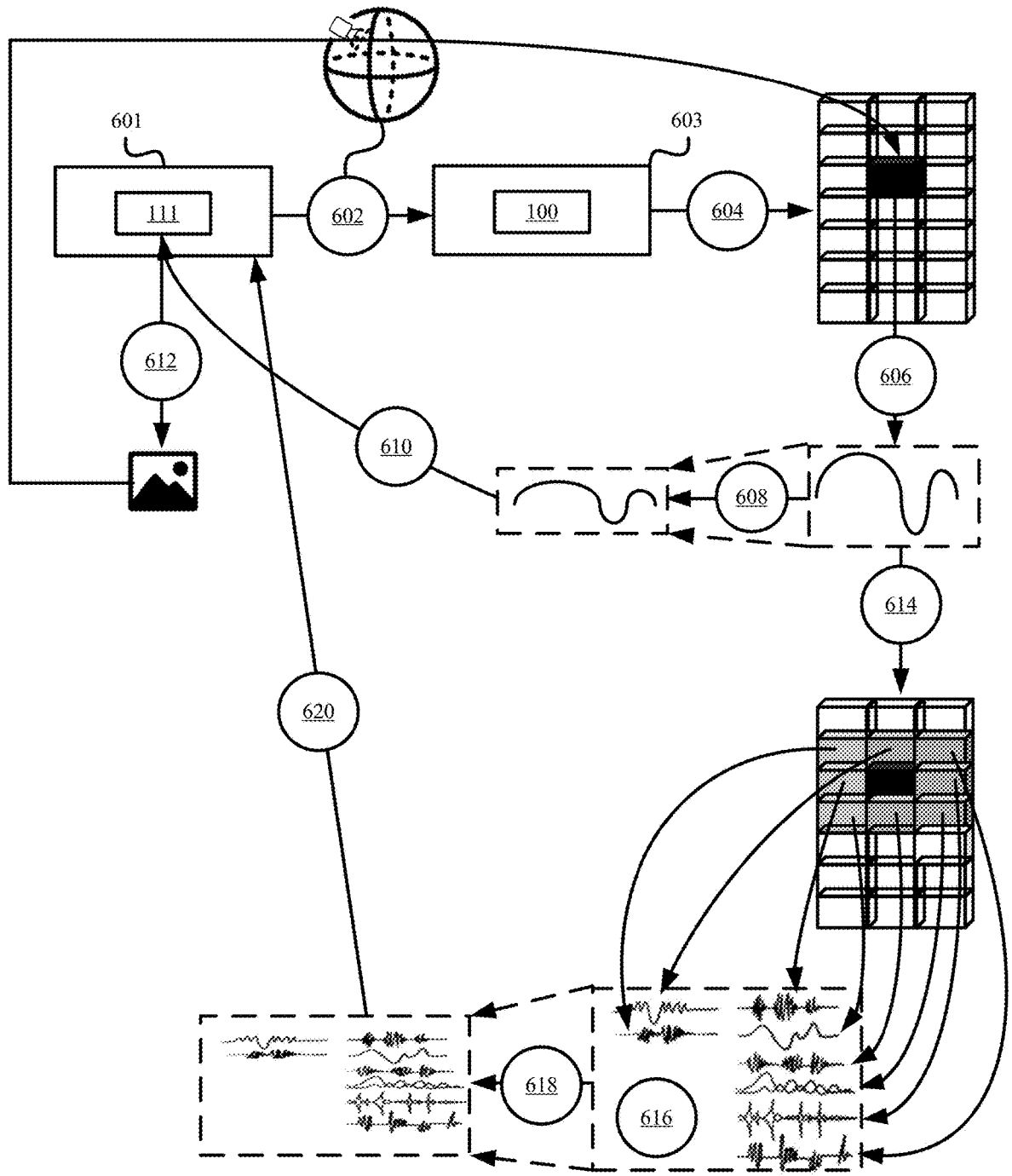
FIG. 6 illustrates an example of the concerted operation between an encoder and a decoder that enables real-time streaming of a point cloud from a local device to a remote device in accordance with some embodiments presented herein.

FIG. 6 illustrates an example of the concerted operation between encoder 100 and decoder 111 that enables real-time streaming of a point cloud from a local device to a remote device in accordance with some embodiments presented herein. Remote device 601 sends (at 602) local device 603 a request to view the point cloud from a first render position and/or a first field-of-view. Remote device 601 may include a device or machine that is used to remotely access, view, edit, and/or otherwise interact with point clouds that are stored on local device 603. Remote device 601 may include a headset, tablet, computer, wearable device (e.g., eyeglasses), gaming device, and/or other network-connected device. Local device 603 may include one or more devices or machines of a point cloud streaming service or provider that are network accessible and/or allow remote devices 601 to access and/or engage with the point cloud content without owning the content or without having to locally store the content. In other words, multiple remote devices 601 may simultaneously access the same particular point cloud from local device 603, and thereby collaborate on a project involving that particular point cloud from different locations and/or using the different remote devices 601.

Encoder 100 receives (at 602) the request, and partitions (at 604) the point cloud into chunked regions based on the first render position and/or the first field-of-view. For instance, encoder 100 partitions (at 604) a first region from the point cloud that encompasses or spans the first field-of-view and contains the data points for rendering the field-of-view. In some embodiments, the first region is larger than the first field-of-view and includes additional data points that surround the first field-of-view in one or more directions. In some such embodiments, the size of the first region and other partitioned regions is determined based on the encoding bitrate, encoding size, compression time, available bandwidth, and/or network latency associated with streaming the compressed waveform representations for a partitioned region to remote device 601. For instance, if remote device 601 is configured to render the point cloud at 30 frames per second, then encoder 100 and decoder 111 have 33.33 milliseconds ("ms") to transmit, decompress, decode, and render the compressed waveform representations for each frame or scene. In some embodiments, encoder 100 and decoder 111 have additional time even with the 30 frames per second rendering of the point cloud. For instance, the rendering system may take 5 frames to change the visualization and/or render movement from one field-of-view to another. In any case, encoder 100 determines a number of data points and/or size of the region or partitioned chunk of the point cloud that may be encoded in each waveform representation, compressed, transmitted to decoder 111, decompressed by decoder 111, and decoded by decoder 111 within the time window available for the smooth rendering of movement within the point cloud.

Encoder 100 encodes (at 606) the data points within the first region as a first set of waveforms. Encoder 100 compresses (at 608) the first set of waveforms, and transmits (at 610) the first set of compressed waveforms to decoder 111 and/or remote device 601 in response to the first request.

Decoder 111 decompresses and decodes the first set of compressed waveforms in order to obtain the data points within the first field-of-view. Decoder 111 and/or the rendering system renders (at 612) the decoded data points in order to generate the visualization of the first field-of-view.

While the first set of compressed waveforms are being transmitted (at 610), decompressed, decoded, and/or rendered (at 612) and before the first render position changes, encoder 100 selects (at 614) a first set of chunks or regions from the partitioned (at 604) point cloud that surround the first region and/or that are in a direction of a tracked movement to the first render position on remote device 601. The first set of chunks or regions may include one or more regions abutting the first region or regions that are in the direction of the tracked movement.

Encoder 100 encodes (at 616) the data points within each region of the first set of regions as different sets of waveforms, and compresses (at 618) each set of waveforms. As long as remote device 601 does not provide an updated render position or a request for a different field-of-view, encoder 100 transmits (at 620) the set of compressed waveforms for each region of the first set of chunks or regions. In some embodiments, encoder 100 prioritizes the encoding (at 616), compression (at 618) and transmission (at 620) of the waveforms for the first set of regions based on a predicted movement of the render position. For instance, if the render position was last moved to the right, encoder 100 may prioritize the encoding (at 616), compression (at 618), and transmission (at 620) of the set of waveforms for a second region that is to the right of the first region. Similarly, if a particular region in the first set of regions contains a higher density of data points, data points with large deviations in the non-positional elements, or another indication of a feature of interest, then encoder 100 may prioritize the encoding (at 616), compression (at 618), and transmission (at 620) of waveforms for that particular region before other regions in the first set of regions.

Decoder 111 receives the compressed waveforms for the regions surrounding the current field-of-view (e.g., the first set of regions), decompresses and decodes the compressed waveforms, and/or caches the decoded data points for the surrounding regions and/or the received compressed waveforms so that the data for the surrounding regions is locally available on remote device 601 and may be immediately rendered without the delays associated with encoding, compressing, and transmitting the compressed waveforms should the first field-of-view change to a second field-of-view that encompasses or spans the data points in one of the surrounding regions.

Any change to the render position or field-of-view is conveyed from remote device 601 to local device 603 and encoder 100. If the field-of-view changes to a surrounding region that has been encoded or transmitted, encoder 100 selects a new set of regions that surround the changed field-of-view, prioritizes the new set of regions based on the direction of movement and/or features contained within each region, encodes the new set of regions according to the prioritization, generates the compressed waveform for each encoded region of the new set of regions, and transmits the compressed waveforms to decoder 111. If the field-of-view changes to include point cloud data points that are not within a selected region or surrounding region, encoder 100 interrupts any encoding that is underway, selects the partitioned region that encompasses or spans the changed field-of-view, encodes the region spanning the changed field-of-view, generates the compressed waveform, transmits the compressed waveform for the region spanning the changed field-of-view, and continues with the encoding and transmission of regions surrounding the region spanning the changed field-of-view.

Figure 7:
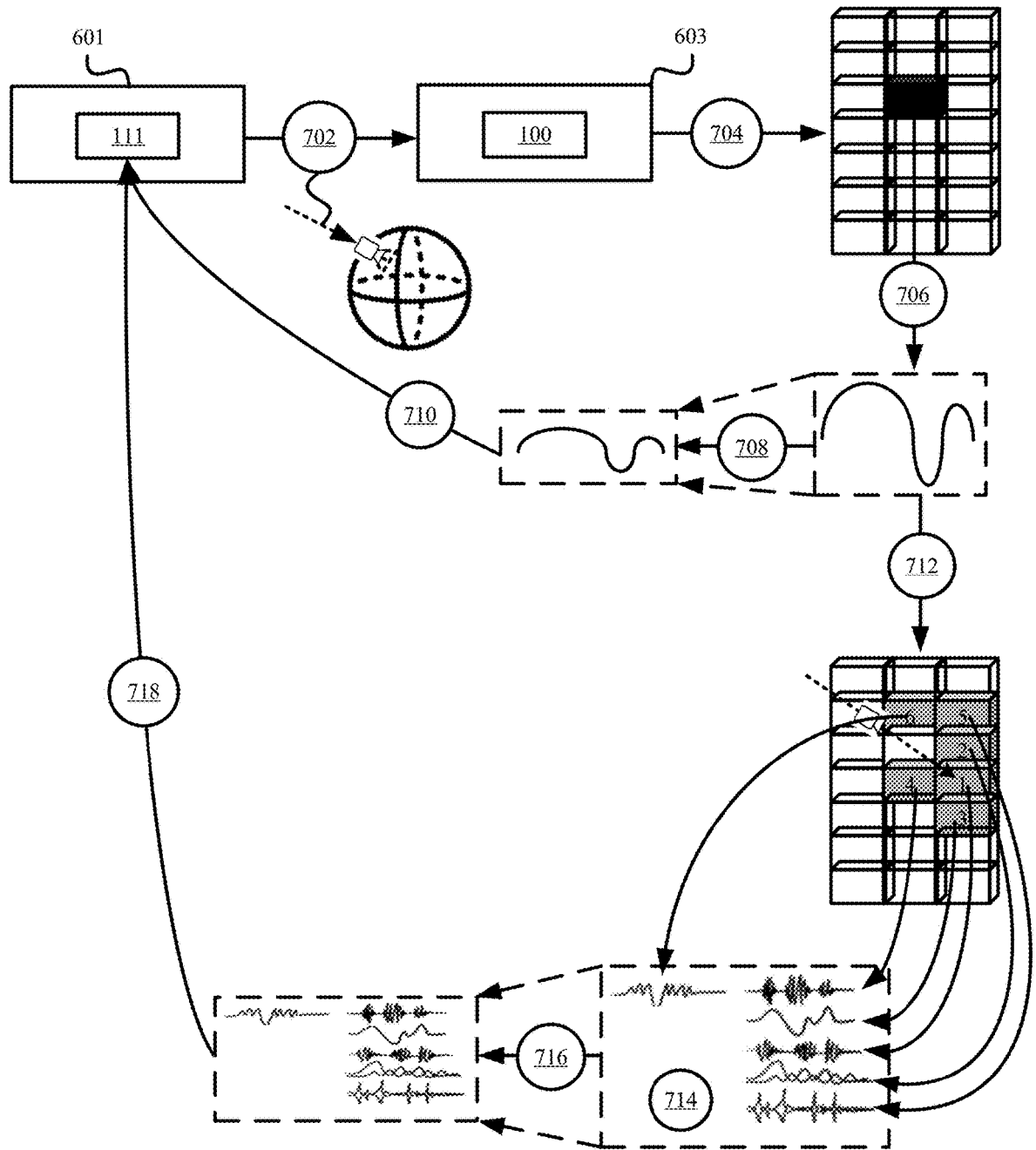
FIG. 7 illustrates an example of the partitioning and prioritized streaming of the waveforms for regions surrounding a current field-of-view in accordance with some embodiments presented herein.

FIG. 7 illustrates an example of the partitioning and prioritized streaming of the waveforms for regions surrounding a current field-of-view in accordance with some embodiments presented herein. Encoder 100 tracks (at 702) the current field-of-view and/or changes to the field-of-view in the viewing of the point cloud on remote device 601. Encoder 100 tracks (at 702) the changing field-of-view based on requests issued by remote device 601, or by receiving user input from remote device 601 as the render position is moved within a user interface presenting the point cloud.

Encoder 100 determines (at 704) the partitioned region that includes the current field-of-view. Encoder 100 encodes (at 706) that partitioned region to one or more waveforms, and compresses (at 708) the one or more waveforms for immediate transmission (at 710) to remote device 601 as one or more compressed waveforms.

Encoder 100 selects (at 712) a predicted set of next regions. In some embodiments, the selection (at 712) of the predicted set of regions may be biased based on the tracked (at 702) changes to the field-of-view. For instance, the predicted set of next regions do not have to include only the regions abutting the region spanning the current field-of-view, but regions that are separated by one or more regions from the region of the current field-of-view and that are in the direction of the tracked (at 702) changes to the field-of-view.

Encoder 100 prioritizes the predicted set of regions based on the tracked (at 702) changes to the field-of-view and/or variations or commonality in the positional and non-positional elements of the data points within each region of the predicted set of regions. Encoder 100 encodes (at 714) one or more waveforms to represent the positional and/or non-positional data for the data points in each of the surrounding regions in the prioritized ordering, compresses (at 716) the one or more waveforms, and transmits (at 718) the compressed one or more waveforms to remote device 601.

Figure 8:
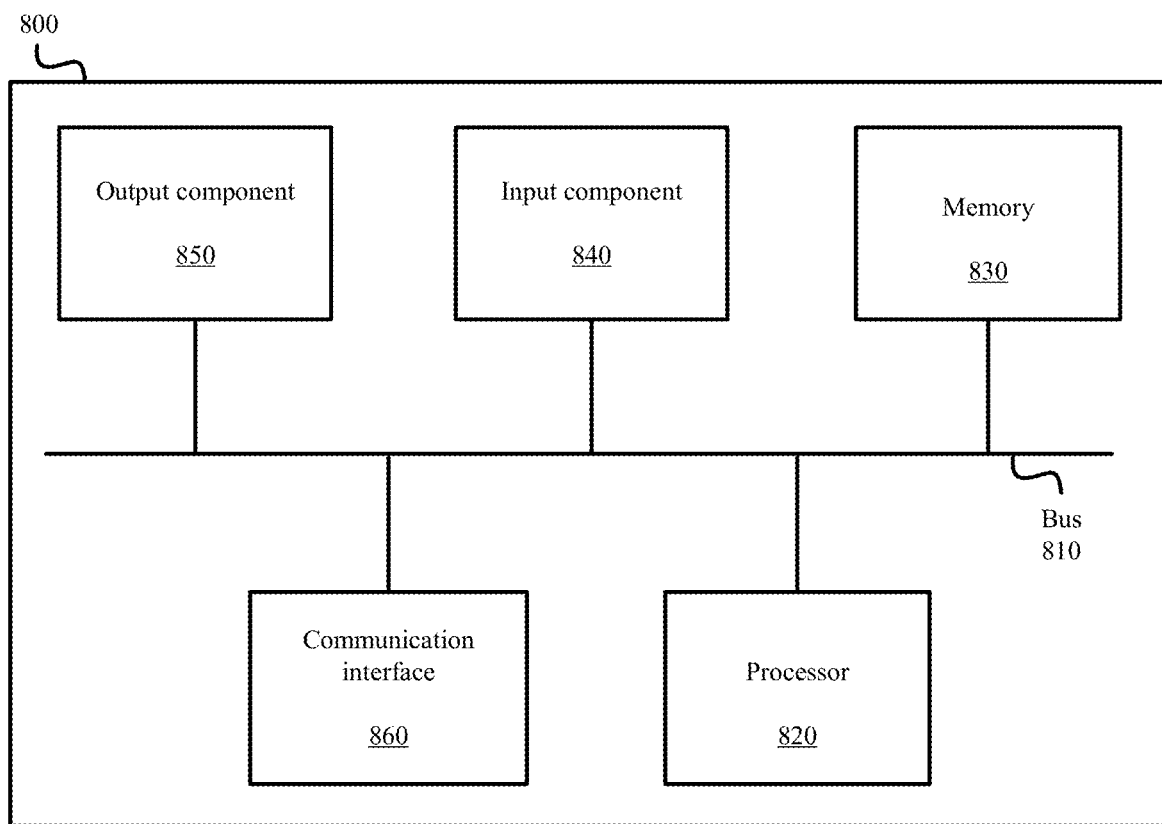
FIG. 8 illustrates example components of one or more devices, according to one or more embodiments described herein.

FIG. 8 is a diagram of example components of device 800. Device 800 may be used to implement one or more of the devices or systems described above (e.g., encoder 100, decoder 111, local device 603, remote device 601, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    issuing a request for a three-dimensional ("3D") visualization;
    receiving a waveform comprising one or more fluctuating signals in response to the request for the 3D visualization, wherein the one or more fluctuating signals encode a frequency domain representation for x, y, and z positional coordinates of a plurality of points forming the 3D visualization;
    decoding different combinations of the x, y, and z positional coordinates from different positions along the one or more fluctuating signals based on a conversion of different frequency domain values represented at the different positions along the one or more fluctuating signals to the different combinations of the x, y, and z positional coordinates;

defining the plurality of points in a 3D space at the different combinations of x, y, and z positional coordinates; and generating the 3D visualization by rendering the plurality of points.

2. The method of claim 1, wherein decoding the different combinations comprises:

decoding x and y positional coordinate combinations from the different positions along a first fluctuating signal of the one or more fluctuating signals; and decoding y and z positional coordinate combinations from the different positions along a second fluctuating signal of the one or more fluctuating signals.

3. The method of claim 1, wherein decoding the different combinations comprises:

decoding the different combinations of x, y, and z positional coordinates from the different positions along at least a first fluctuating signal of the one or more fluctuating signals; and decoding visual characteristics for the plurality of points positioned at the different combinations of the x, y, and z positional coordinates from the different positions along at least a second fluctuating signal of the one or more fluctuating signals.

4. The method of claim 3 further comprising:

defining colors of the plurality of points based on the visual characteristics that are decoded from the different positions along at least the second fluctuating signal.

5. The method of claim 1, wherein decoding the different combinations comprises:

decoding a first x, y, and z positional coordinate from a first peak of the one or more fluctuating signals; and decoding a second x, y, and z positional coordinate from a second peak of the one or more fluctuating signals having a different amplitude than the first peak.

6. The method of claim 1, wherein decoding the different combinations comprises:

decoding the different combinations of x, y, and z positional coordinates based on a changing amplitude of the one or more fluctuating signals.

7. The method of claim 1, wherein decoding the different combinations comprises:

decoding a first positional coordinate for a particular point of the plurality of points from a particular position about a first fluctuating signal of the one or more fluctuating signals;

decoding a second positional coordinate for the particular point from the particular position about a second fluctuating signal of the one or more fluctuating signals; and decoding a third positional coordinate for the particular point from the particular position about a third fluctuating signal of the one or more fluctuating signals.

8. The method of claim 7, wherein defining the plurality of points comprises:

generating the particular point at the first positional coordinate, the second positional coordinate, and the third positional coordinate in the 3D space.

9. The method of claim 1, wherein generating the 3D visualization comprises:

generating a 3D shape of an object from rendering the plurality of points in the 3D space at the different combinations of x, y, and z positional coordinates.

10. The method of claim 1, wherein decoding the different combinations comprises:

mapping the different positions along the one or more fluctuating signals to different x, y, and z positional coordinates.

11. The method of claim 1, wherein one or more files or data packets storing the plurality of points have a larger size than one or more files or data packets storing the waveform.

12. The method of claim 1, wherein decoding the different combinations comprises:

extracting original positional coordinates that are defined for the plurality of points of the 3D visualization from the waveform without data loss.

13. The method of claim 1, wherein receiving the waveform comprises:

receiving a first fluctuating signal at a first time and a second fluctuating signal at a second time that is after the first time, wherein the first fluctuating signal encodes the different combinations of x, y, and z positional coordinates for a first set of the plurality of points that form a first field-of-view, and wherein the second fluctuating signal encodes the different combinations of x, y, and z positional coordinates for a second set of the plurality of points that form a different second field-of-view that is presented after the first field-of-view.

14. The method of claim 1, wherein decoding different combinations comprises:

applying an inverse transform function to the one or more fluctuating signals; and obtaining the different combinations of x, y, and z positional coordinates in response to applying the inverse transform function.

15. A decoding system comprising:

one or more hardware processors configured to:

issue a request for a three-dimensional ("3D") visualization;

receive a waveform comprising one or more fluctuating signals in response to the request for the 3D visualization, wherein the one or more fluctuating signals encode a frequency domain representation for x, y, and z positional coordinates of a plurality of points forming the 3D visualization;

decode different combinations of the x, y, and z positional coordinates from different positions along the one or more fluctuating signals based on a conversion of different frequency domain values represented at the different positions along the one or more fluctuating signals to the different combinations of the x, y, and z positional coordinates;

define the plurality of points in a 3D space at the different combinations of x, y, and z positional coordinates; and generate the 3D visualization by rendering the plurality of points.

16. The decoding system of claim 15, wherein decoding the different combinations comprises:

decoding x and y positional coordinate combinations from the different positions along a first fluctuating signal of the one or more fluctuating signals; and decoding y and z positional coordinate combinations from the different positions along a second fluctuating signal of the one or more fluctuating signals.

17. The decoding system of claim 15, wherein decoding the different combinations comprises:

decoding the different combinations of x, y, and z positional coordinates from the different positions along at least a first fluctuating signal of the one or more fluctuating signals; and decoding visual characteristics for the plurality of points positioned at the different combinations of the x, y, and z positional coordinates from the different positions along at least a second fluctuating signal of the one or more fluctuating signals.

18. The decoding system of claim 15, wherein decoding the different combinations comprises:

decoding a first x, y, and z positional coordinate from a first peak of the one or more fluctuating signals; and decoding a second x, y, and z positional coordinate from a second peak of the one or more fluctuating signals having a different amplitude than the first peak.

19. A non-transitory computer-readable medium storing instructions that, when executed by one or more processors of a decoding system, cause the decoding system to perform operations comprising:

issuing a request for a three-dimensional ("3D") visualization;

receiving a waveform comprising one or more fluctuating signals in response to the request for the 3D visualization, wherein the one or more fluctuating signals encode a frequency domain representation for x, y, and z positional coordinates of a plurality of points forming the 3D visualization;

decoding different combinations of the x, y, and z positional coordinates from different positions along the one or more fluctuating signals based on a conversion of different frequency domain values represented at the different positions along the one or more fluctuating signals to the different combinations of the x, y, and z positional coordinates;

defining the plurality of points in a 3D space at the different combinations of x, y, and z positional coordinates; and generating the 3D visualization by rendering the plurality of points.

20. The method of claim 1 further comprising:

generating new points that are not originally part of the 3D visualization based on x, y, and z positional coordinates that are derived from positions along the one or more fluctuating signals that are between positions representing x, y, and z positional coordinates of two or more points that are originally part of the 3D visualization.

* * * * *